Figures 1, 2:
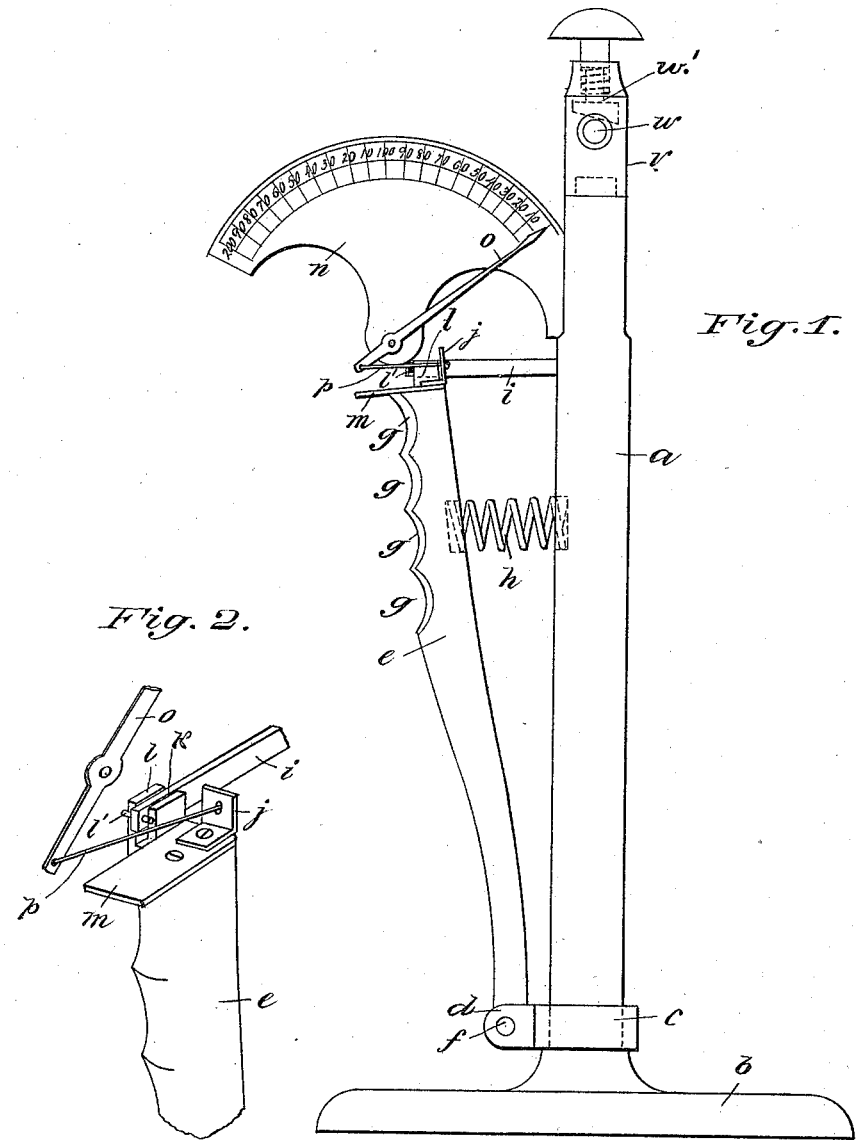

(No Model.)

G. B. FOWLER.
HAND GRIP TESTER.

No. 344,095. Patented June 22, 1886.

Attest:
Andrew J. Steiger,
Chas. H. Yates.

Inventor:
George B. Fowler
By K. Newell
his Atty.

UNITED STATES PATENT OFFICE.

GEORGE B. FOWLER, OF BROOKLYN, ASSIGNOR OF ONE-HALF TO ANDREW PECK AND WASHINGTON I. SNYDER, BOTH OF NEW YORK, N. Y.

HAND-GRIP TESTER.

SPECIFICATION forming part of Letters Patent No. 344,095, dated June 22, 1886.

Application filed March 6, 1886. Serial No. 194,280. (No model.)

*To all whom it may concern:*

Be it known that I, GEORGE B. FOWLER, a citizen of the United States, residing at Brooklyn, in the county of Kings and State of New York, have invented a certain new and useful Hand-Grip Tester, of which the following is a full, clear, and exact specification.

My invention relates to a device for testing or registering the gripping-power of the human hand; and it consists of a stationary post, an arm hinged thereto and having an interposed spring, and a rod connecting said arm with a pointer on a scale or registering plate, to register the amount of pressure applied to the arm.

In the accompanying drawings, which fully illustrate my invention, Figure 1 is a side elevation of my improved hand-testing machine; and Fig. 2 is an enlarged detail view in perspective, showing the link-connection between the grip-arm and the indicator.

Let $a$ represent an upright bar or post mounted on the flat base-piece $b$. On the lower end of the post is a collar, $c$, having side flanges or lugs, $d\ d$, to which an upright arm, $e$, is pivoted by means of the pin $f$. This arm bends outward to about midway of its length, and on its outer surface are formed a number of depressions, $g$, adapted to receive the fingers when the instrument is grasped with the hand.

$h$ is a spiral spring interposed between the post and its movable arm, the ends of the spring being loosely held in recesses formed in the post and arm.

To the upright bar or post $a$, near its top, is secured a horizontal bar, $i$, which serves as a guide-bar, on which the arm $e$ moves. A projection, $l$, on the top of the arm $e$ is provided with a slot, $k$, to receive the bar $i$, and pins or studs $l'$ prevent the arm $e$ from slipping off of the guide-bar by the action of the spring. A projecting plate, $m$, on the top of the movable arm $e$ forms a bearing for the fingers, to prevent their slipping when the instrument is gripped.

To the upper part of the post $a$ is secured the curved scale $n$, graduated to indicate pounds pressure, and having the hand or pointer $o$. The end of the pointer is connected with the movable arm $e$ by the rod $p$, which passes through and works in the vertical piece $j$, projecting from the top of the movable arm $e$. A head on the end of the rod $p$ holds it in position.

In operation the instrument is embraced by the hand, the fingers resting in the depressions. The amount of gripping-power exerted on the arm $e$ to move it is registered by the pointer on the scale.

The upper portion of the post $a$ is made detachable and in the form of a hollow case, $v$, suitable to contain a device, $w'$, consisting of a stem carrying a cutting-blade and operated by a spring for clipping off the ends of cigars. A hole, $w$, in the side of the case is provided for the insertion of the end of the cigar. The ends of the upper section and of the main post are provided with screw-threads and screw one upon the other.

What I claim as new, and desire to secure by Letters Patent, is—

1. A hand-grip tester comprising a standard having an arm hinged thereto, a spring arranged to bear against said arm, a scale, and a pointer connected to the movable arm, for registering the amount of pressure applied, as set forth.

2. In a hand-grip tester, the combination of the register $n$, pointer $o$, standard $a$, arm $e$, hinged thereto, rod $p$, and spring $h$, all arranged and operating as set forth.

3. The combination of the standard $a$, hinged arm $e$, spring $h$, slotted plate $l$, bar $i$, rod $p$, pointer $o$, connected to arm $e$, and scale $n$, as set forth.

4. In a hand-grip tester, the combination of the post $a$, having the flat base $b$ and provided with a detachable top part containing a cigar-clipping device, hinged arm $e$, pointer $o$, connecting-rod $p$, scale $n$, and spring $h$ between the fixed post and movable arm, as set forth.

5. The combination, with the post $a$, scale $n$, pointer $o$, and connecting-rod $h$, of the hinged arm $e$, provided with finger-recesses $g$ and bearing-plate $m$, as and for the purpose set forth.

GEORGE B. FOWLER.

Witnesses:
CHAS. H. YATES,
K. NEWELL.